United States Patent [19]

Norris

[11] Patent Number: 5,689,269
[45] Date of Patent: Nov. 18, 1997

[54] GPS RELATIVE POSITION DETECTION SYSTEM

[75] Inventor: Elwood G. Norris, Poway, Calif.

[73] Assignee: American Technology Corporation, Poway, Calif.

[21] Appl. No.: 377,973

[22] Filed: Jan. 25, 1995

[51] Int. Cl.$^6$ .............................. H04B 7/185; G01S 5/02
[52] U.S. Cl. ......................................... 342/357; 364/449.7
[58] Field of Search .......................... 342/357; 455/12.1; 364/449.7

[56] References Cited

U.S. PATENT DOCUMENTS

| | | |
|---|---|---|
| 3,063,048 | 11/1962 | Lehan et al. |
| 4,021,807 | 5/1977 | Culpepper et al. |
| 4,593,273 | 6/1986 | Narcisse. |
| 4,675,656 | 6/1987 | Narcisse. |
| 5,021,794 | 6/1991 | Lawrence. |
| 5,119,504 | 6/1992 | Durboraw, III. |
| 5,172,110 | 12/1992 | Tiefengraber. |
| 5,245,314 | 9/1993 | Kah, Jr. |
| 5,289,195 | 2/1994 | Inoue. |
| 5,307,277 | 4/1994 | Hirano. |
| 5,361,212 | 11/1994 | Class et al. ............................. 364/428 |
| 5,364,093 | 11/1994 | Huston et al. ......................... 273/32 R |
| 5,379,224 | 1/1995 | Brown et al. .......................... 364/449 |
| 5,389,934 | 2/1995 | Kass ....................................... 342/357 |
| 5,408,238 | 4/1995 | Smith ..................................... 342/357 |
| 5,434,789 | 7/1995 | Fraker et al. ........................... 364/460 |
| 5,438,518 | 8/1995 | Bianco et al. .......................... 364/460 |
| 5,469,175 | 11/1995 | Boman .................................... 342/357 |
| 5,506,587 | 4/1996 | Lans ........................................ 342/357 |
| 5,539,398 | 7/1996 | Hall et al. ............................... 340/907 |

OTHER PUBLICATIONS

GPS Technology And Opportunities by Clyde Harris and Roy Sikorski.
Utah Meeting Shows Amazing World Of Navigation Satellites by Lee Siegel.
A Marriage Made In Orbit: GPS And PCS by Francis X. Kane.
A Sampling Of Global Positioning System Receivers by Don Herskovitz.
How Mobile Computers Can Help You Find Yourself by Gerald Houston.
This 'Remote' Shows Its Users Exactly Where Here Is by Liz Mullen.
Car 54, Where Are You? by Michael Puttre.
United States Securities And Exchange Commission From 10–K For Trimble Navigational Limited.

*Primary Examiner*—Theodore M. Blum
*Attorney, Agent, or Firm*—Thorpe, North & Western

[57] ABSTRACT

A system of devices both capable of receiving civilian GPS signals, but also capable of providing a relative distance and direction indication that is accurate to several meters. A first device would be capable of transmitting its GPS determined position to a second device. The second device would include a means for receiving the GPS determined position of the first device, and would also include means for calculating the relative distance and direction between the first and second devices. The system would further include the ability of the first device to selectively transmit telemetry at a desired frequency. By providing the second device with the ability to selectively tune a receiver to receive a telemetry signal broadcast by different devices, a distance and direction to a plurality of first devices is possible.

13 Claims, 6 Drawing Sheets

GPS RELATIVE POSITION DETECTION SYSTEM

BACKGROUND OF THE INVENTION

1. Field of the Invention

This invention pertains to position determining devices, and in particular to devices that enable the position of an object or person to be determined relative to another person seeking said object, wherein a global positioning system receiver is used to determine the distance, direction and possible elevation difference between another global positioning system receiver.

2. Prior Art

Determining exactly where someone or something is on or above the surface of the earth has long held promise for many purposes. In rescue operations, it has been thought that locating lost people might be simpler if they had a transmitter signal that could be tracked. However, difficulties in actually tracking a signal hinder the usefulness of such systems.

For example, U.S. Pat. No. 4,021,807 teaches how a transmitter hidden among stolen money could be used to locate those responsible for the theft and the money. A UHF homing device hidden among the money is capable of transmitting a signal that can be tracked by UHF tracking devices. Such a device indicates whether the signal is being transmitted from the front or rear, and to the left or right of a current position. Signal strength can also be used to give a crude estimation of distance if it is not too distorted by intervening structures.

The UHF homing beacon and tracking device comprise the same principle taught in U.S. Pat. No. 5,021,794. This patent teaches how a miniaturized transceiver carried by a child can be remotely activated by a parent to enable the child to be located by police cars with UHF trackers.

One of the drawbacks of such locator systems is that the position of the person or object is never known with any degree of accuracy. A vehicle with a tracking device might circle a homing beacon many times before finding it due to the crude distance and direction indications of the technology.

Fortunately, a boon to precise location determining occurred when the United States saw fit to invest over $12 Billion in creating a network of 24 satellites in low earth orbit, each broadcasting precise timing signals from two on-board atomic clocks. Using precise and well-developed triangulation formulas, a receiver that picks up signals from several satellites simultaneously can determine its position in global coordinates, namely latitude and longitude.

With this network orbiting overhead, a person anywhere on the earth has a 24 hour a day line-of-sight view to a sufficient number of satellites that enable a person with A GPS receiver to be able to determine their own longitude and latitude to within several meters, as well as their elevation. However, knowing your own position does not help others find you without extremely precise maps showing longitude and latitude. Nevertheless, the elements for a novel search and rescue system, as well as a general purpose locator are made possible by the present invention utilizing GPS technology. Before the invention can be explained, however, a potential problem with GPS signals must first be explained.

In navigation, a method of guiding ships commonly used is dead-reckoning, where velocity and direction of a ship from a known position is used to calculate the present position. The drawback is that the further a ship moves away from a known position, the less accurate the dead-reckoning position becomes. Inclement weather can further erode the accuracy of a ship's navigation, and endanger lives and property when traveling in close proximity to land. With GPS, a very accurate map can be used to guide the movements of even a large vessel with a high degree of precision. The problem with GPS signals, surprisingly, arises from the high degree of precision that the system is able to provide.

It is the potential of GPS for military applications that is responsible for the concern over GPS accuracy. Specifically, precise positioning of targets can enable pinpoint accuracy in the delivery of payloads. The possibility exists that our own satellite network could be used against the United States. For this reason, the signals broadcast by the satellite network for commercial use are intentionally made less accurate than the encoded military signals. These timing and position errors are called Selective Availability (SA) and reduce the accuracy of civilian users to roughly 100 meters. While this inaccuracy is irrelevant on the high seas, coastal navigation or land-based applications such as search and rescue suffer, and potentially destroy benefits of GPS technology.

To overcome the intentional errors introduced in the GPS signals, a system known as differential GPS (DGPS) was developed to reestablish accuracy for civilian users in a small, localized area such as coastal navigation. The system requires that a permanent GPS receiving and broadcasting station be established, and that the precise position of the station be determined. Using the fact that the errors introduced by a system of satellites will be the same errors transmitted to all receivers in a localized area, a mobile GPS receiver in range of the permanent station can determine its position and achieve the same degree of accuracy enjoyed by the military. This is accomplished by having the permanent station calculate the error introduced by the GPS satellites by comparing the signal received with the actual known position. This error factor can be transmitted to and used by all mobile receivers in the vicinity of the permanent station to determine their position accurately to within several meters instead of 100 meters.

Returning now to our problem of locating a lost person, the exact longitude and latitude provided by DGPS is not often useful without very precise maps. Elevation may also play a very important factor if someone is lost in mountainous terrain. Therefore, it would be an advance over the prior art if a very precise distance measurement accurate to several meters and an exact direction could be provided to searchers looking for a lost person using GPS signals, regardless of whether a permanent station is nearby providing GPS SA error compensation information. It would also be an advance over the prior art if the difference in elevation between the searchers and the lost person could be provided to that same degree of accuracy.

OBJECTS AND SUMMARY OF THE INVENTION

It is therefore an object of the present invention to provide a method and apparatus for locating the relative position of a GPS receiver.

It is another object to provide a method and apparatus for determining the precise distance and direction of a GPS receiver relative to the apparatus.

It is yet another object of the present invention to provide a method and apparatus for determining the difference in elevation between the apparatus and a GPS receiver.

It is still another object to provide a method and apparatus for providing the precise distance, direction and elevation to a GPS receiver that broadcasts a predetermined signal by selectively tuning the apparatus to the signal.

These and other objects not specifically recited are realized in a system of devices, both capable of receiving civilian GPS signals, but also capable of providing a relative distance and direction indication that is accurate to several meters. A first device that would be with the person or object to be located would also be capable of transmitting its GPS determined position to a second device. The second device would include a means for receiving the GPS determined position of the first device, and would also include means for calculating the relative distance and direction between the first and second devices based on the telemetry of the first device and its own GPS determined position.

The system would further include the ability of the second device to tune to a signal broadcast by different GPS devices. By selectively tuning to the signal of a desired GPS device, a distance and direction to a plurality of different GPS receiving devices is possible.

Also disclosed is a method for determining the distance, direction and elevation to a GPS receiving device, and includes the steps of (i) providing a first GPS receiver whose location will be determined, (ii) providing a second GPS receiver that can calculate a relative distance, direction and elevation between the first and second GPS receivers, (iii) enabling the first GPS device to determine a Selective Availability error induced longitude and latitude, and to transmit this position to the second GPS device, (iv) enabling the second GPS device to receive the first GPS device's telemetry signal, (v) enabling the second GPS device to determine its own SA error induced longitude and latitude, (vi) comparing the telemetry of the first GPS device to the second GPS device, and using the comparison of longitudes and latitudes to determine the relative distance, direction and elevation between said devices.

DETAILED DESCRIPTION OF THE INVENTION

Figure 1:
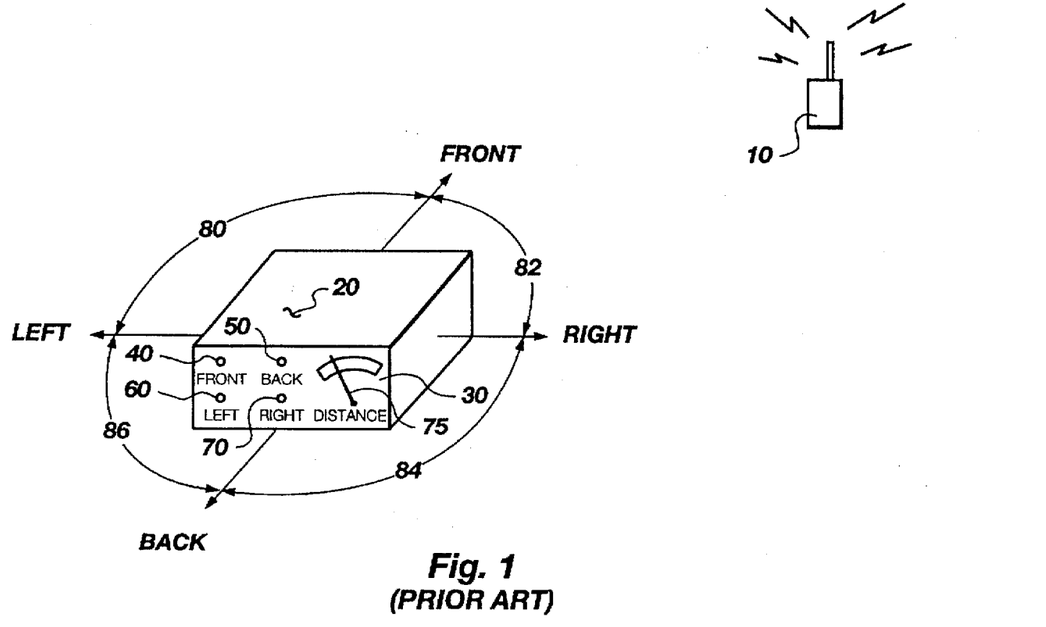
FIG. 1 is an illustration of the components in a UHF tracking device of the prior art.

FIG. 1 illustrates the components and a typical display of a UHF tracking system. As shown, a transmitter 10 is at some unknown location some distance from the tracking device 20. The tracking device is typically mounted inside a vehicle, such as a police car. When the transmitter 10 is activated, the tracking device "homes in" on the transmitter. This is accomplished by a display 30 indicating whether the transmitter 10 is in front 40 or in back 50, to the left 60 or the right 70 of the tracking device 20. A distance indicator 75 also shows a relative distance to the transmitter 10 by indicating the strength of the signal received.

Such a system only provides vague references to the location of the transmitter 10 at best. For example, the direction of the transmitter 10 can only be known to within 90 degrees. This is because the frontback and leftright indicators 40, 50, 60 and 70 only define four directions, 80, 82, 84 and 86 in which the transmitter 10 could be. In addition, because the distance indicator 75 relies only on signal strength received, a distortion or interference with the transmitted signal could give a false indication of actual distance to the transmitter 10. Furthermore, the UHF signal tracker 20 cannot indicate a height variance between the transmitter 10 and the tracking device 20.

Figure 2:
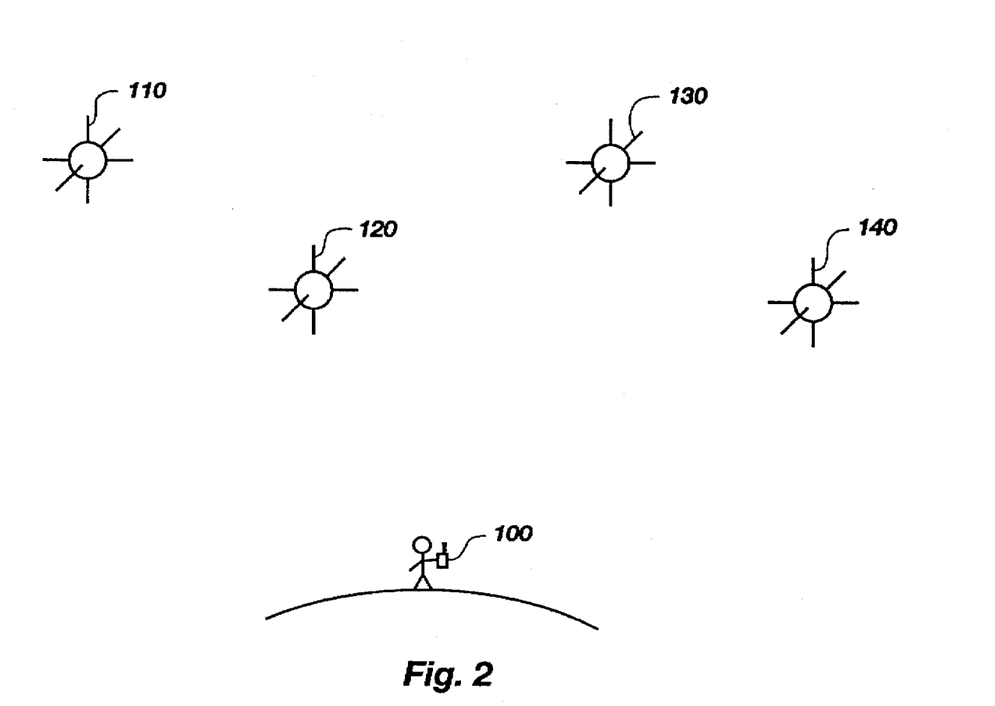
FIG. 2 is a perspective view of the components of a Global Positioning System (GPS).

FIG. 2 illustrates the original concept of the Global Positioning System (GPS). A GPS receiver 100 receives timing signals from at least three, and preferably four low earth orbiting satellites 110, 120, 130 and 140. The timing signals are provided by extremely accurate atomic clocks, two clocks aboard each satellite to provide backup. Three satellites provide sufficient information for a GPS receiver 100 to calculate a longitude and latitude using triangulation formulas well known to those skilled in the art. If a signal can be received from four satellites, the altitude of the GPS receiver 100 can also be determined.

Figure 3:
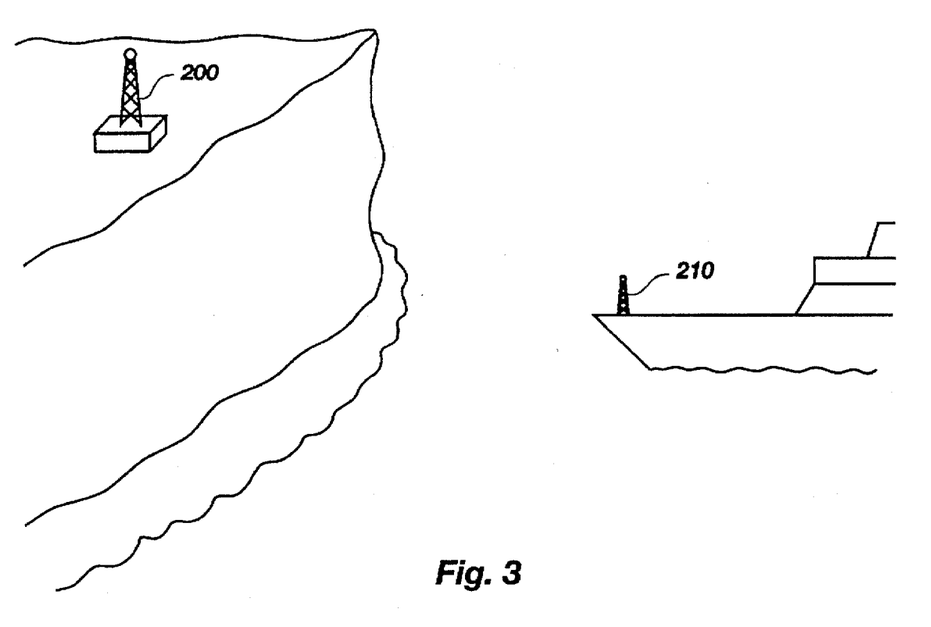
FIG. 3 is a perspective view of the components of a Differential GPS (DGPS) system.

FIG. 3 illustrates the differential GPS (DGPS) concept that was made necessary by the military's introduction of an error into the GPS signals broadcast by the satellites. For coastal navigation, a series of permanent GPS stations 200 such as the one shown broadcast an error correction code that enables mobile GPS receivers 210 in the vicinity of the permanent GPS station 200 to determine their position to the same level of accuracy enjoyed by military systems. The Selective Availability (SA) error is corrected by using the previously determined accurate position of the permanent station 200, receiving the GPS signals to calculate a position, determining the error between the broadcast position and the known position, and then broadcasting the error correction factor to GPS receivers. GPS receivers 210 then correct their own GPS calculated position using the broadcast correction factor. The error correction factor is only accurate for GPS receivers near the permanent station.

While the DGPS system does restore accuracy to the GPS position calculations, the system is only useful for search and rescue or position locating if very detailed maps are available.

Figure 4:
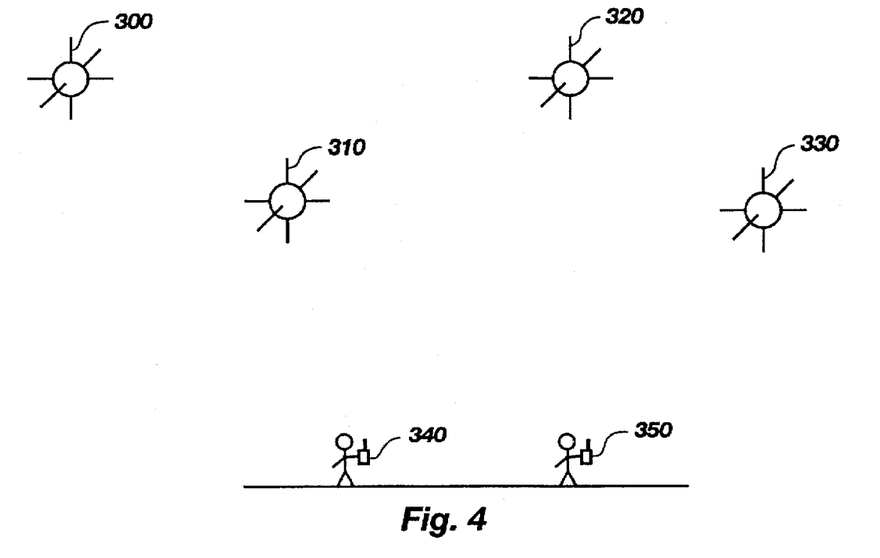
FIG. 4 is a perspective view of the components in a relative GPS system made in accordance with the principles of the present invention.

FIG. 4 illustrates the preferred embodiment that overcomes the need for detailed maps when locating a GPS receiver made in accordance with the present invention. The same number of satellites are necessary as in the normal GPS position determining system of FIG. 1. Three satellites 300, 310 and 320 provide sufficient information to determine a position, and a fourth satellite 330 can provide an altitude measurement. One of the points of novelty of the present invention is that the civilian Selective Availability induced error has no effect on the accuracy of the present invention. Furthermore, there is no need for permanent GPS stations providing error correction, because the position of the actual longitude and latitude of the GPS receivers is irrelevant. All that is required is that the error be nearly the same for both receivers. This requirement is easily satisfied because the induced position error will be nearly the same for GPS receivers within several hundred kilometers. In addition, as the GPS receivers get closer, the error becomes negligible.

Figure 5:
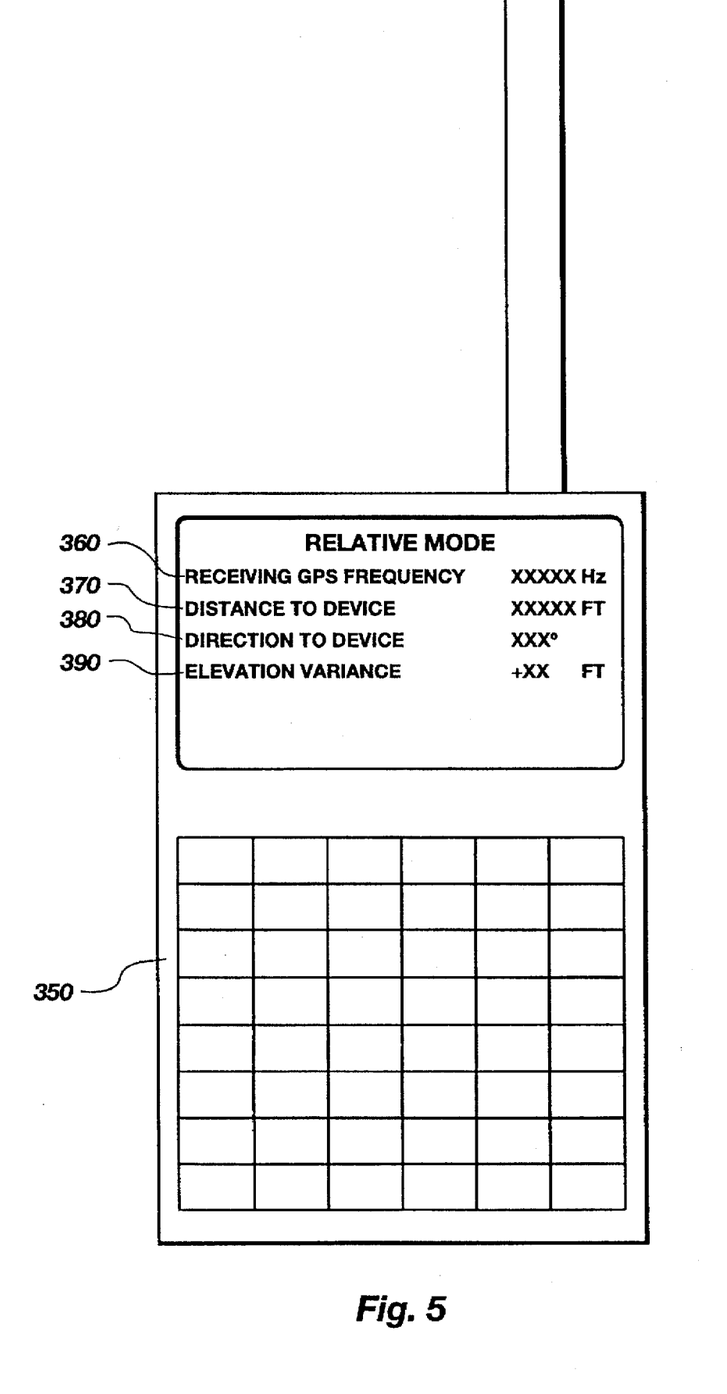
FIG. 5 is the display of the relative GPS device illustrated in FIG. 4.

Both of the GPS receivers are capable of determining their position according to the methods well known to those skilled in the art through triangulation formulas. The innovation begins with one of the GPS receivers 340 being modified to transmit this position as telemetry data. A second GPS receiver 350 is modified to receive this telemetry. After receiving the transmission, the second GPS receiver 350 calculates a relative distance between the GPS receivers 340 and 350. The longitude and latitude are not displayed when the second GPS receiver is in a relative mode. Instead, information is displayed as illustrated in FIG. 5.

Figure 8:
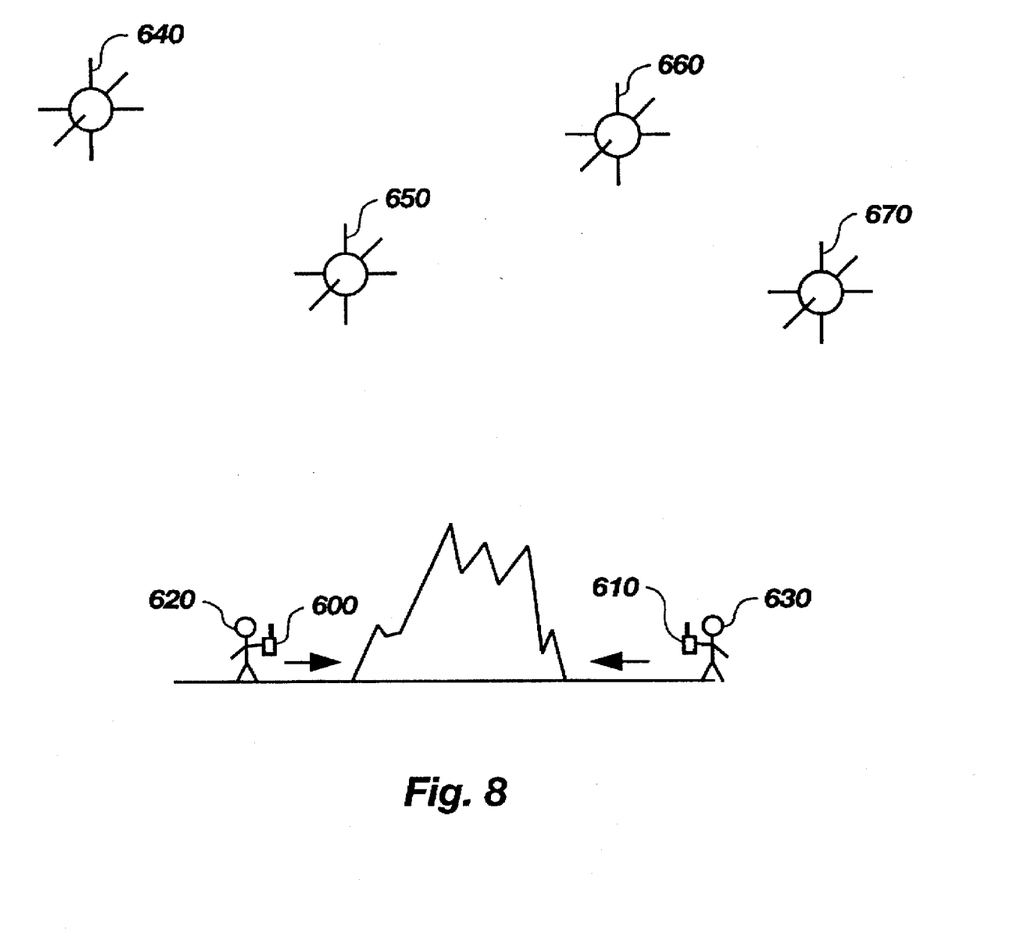
FIG. 8 is a perspective view of another embodiment of the present invention.

After choosing a relative mode, the second GPS receiver 350 displays the frequency it is tuned to receive 360. The distance to the first GPS device 370 is displayed in whatever units of measurement the user desires, but is capable of automatically choosing an appropriate scale and unit such as feet, yards, miles, meters or kilometers. In addition, the direction 380 to the transmitting GPS device 340 is displayed based on the unit of degrees. An elevation variance 390 is displayed if line-of-sight was established between both GPS receivers and a fourth satellite 330 (FIG. 4). The device shown is the second GPS device, or master unit. The first GPS device does not require a display for operation, because the second device is being used to locate the first device. A variation on this embodiment is explained in FIG. 8, and basically involves two master units with displays, and the ability of the master units not only to receive GPS location information from another GPS device, but to transmit their own geographic location as well.

Figure 6:
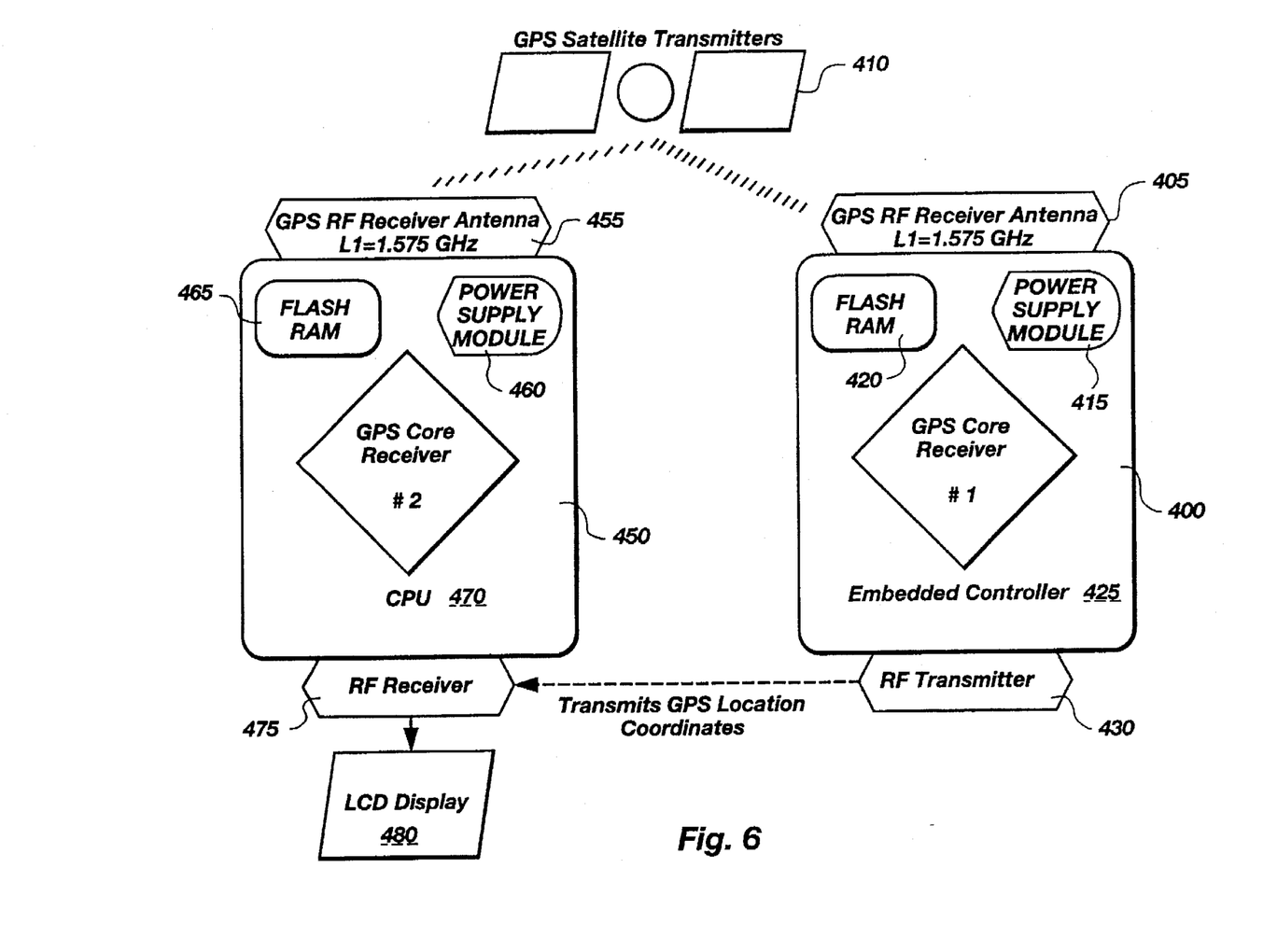
FIG. 6 is a block diagram of the components of the relative GPS system used in FIG. 4.

FIG. 6 illustrates the basic components used in the GPS receivers of the present invention. A first GPS device 400 comprises an RF receiving antenna 405 tuned to the GPS satellite broadcasting frequency of 1.575 GHz for receiving clock signals from the GPS Satellite transmitters 410 in orbit. The first GPS device 400 contains a power supply module 415 and flash RAM 420 for storing computations. The GPS calculations are made by an internal embedded controller 425 which determines a geographic location using the received satellite transmissions. This location is transmitted by means of an RF transmitter 430 to a second GPS device 450. This second GPS device 450 is similar to the first GPS device 400 in that the second device 450 also receives GPS satellite information through an antenna 455, and contains a power supply 460 and flash RAM 465. However, the second GPS device 450 has a CPU 470 capable of handling more diverse tasks than the embedded controller 425 of the first GPS device 400. In addition, the second device 450 has an RF receiver 475 for receiving the transmitted geographic location of the first GPS device 400. Finally, the second GPS device 450 has an LCD display 480 for indicating to the user where the first GPS device 400 is located relative to the second GPS device 450. A variation on this embodiment would be an LCD display on the first GPS device 400.

Variations on the basic system are possible depending upon the particular application of the present invention. For example, another embodiment would be at a golf course 500. Each golf hole 510 of the course would be equipped with a GPS receiver 520 capable of transmitting a GPS determined position. A golfer would tune a GPS receiver 530 to the predetermined frequency of the particular golf hole the golfer is trying to reach. If the golf hole 510 is obscured by a hill or foliage 540, the golfer 550 will always know the precise distance and direction to aim, as well as the correct club to use. When a golf hole is completed, the golfer tunes to the frequency the next golf hole GPS receiver is using to transmit its GPS determined position. Not only would selective tuning to receive different GPS signals be possible, but GPS receivers could also selectively transmit on desired frequencies.

Figure 7:
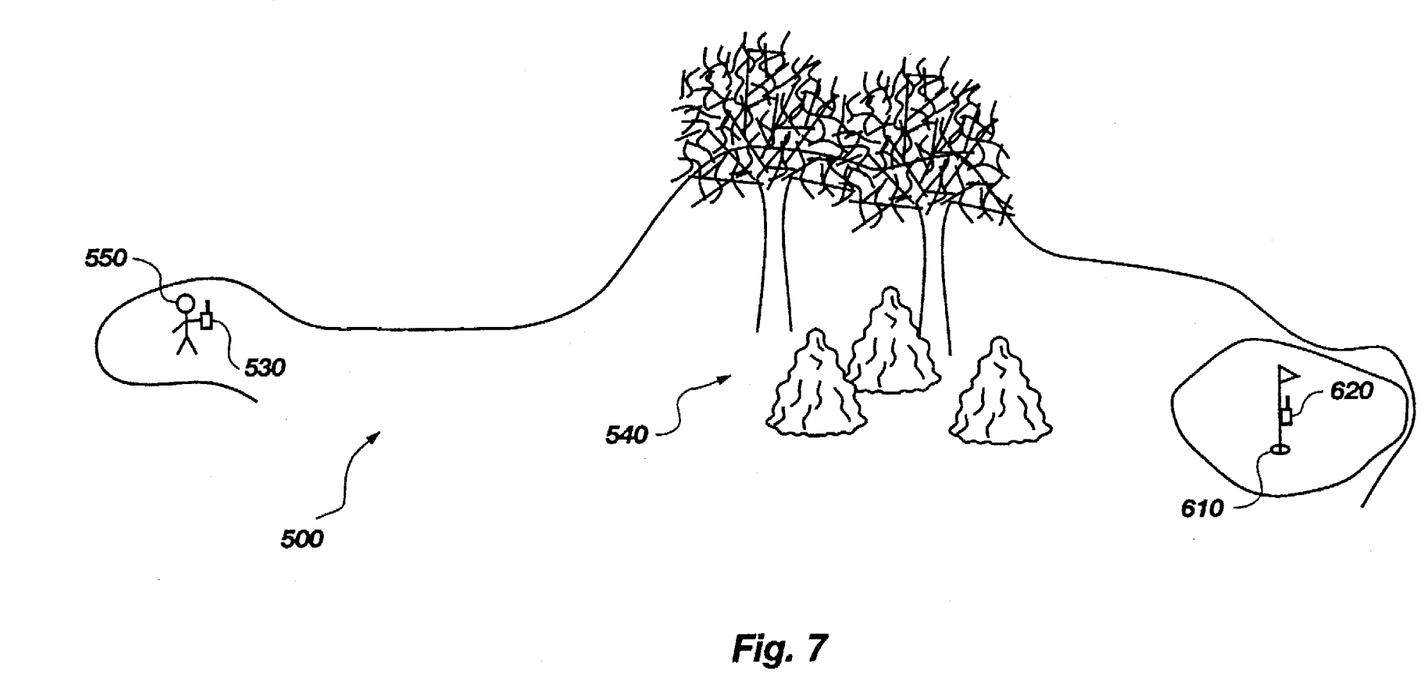
FIG. 7 is a perspective view of another embodiment of the present invention.

Another embodiment of the present invention would be GPS receivers 600 and 610 capable of both transmitting their GPS determined position and receiving the GPS position of the other GPS receiver as illustrated in FIG. 7. As before, the GPS satellites 640, 650, 660, and 670 would enable the GPS receivers 600 and 610 to determine their position on or above the earth, and their altitude. The result of this embodiment would be to enable both parties 620 and 630 carrying GPS relative position receivers 600 and 610 to move towards each other simultaneously.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A relative position indicating system comprising:

a first GPS receiver including means for receiving a plurality of GPS signals from different sources and means for determining a geographical location of the first receiver;

a transmitter associated with the first GPS receiver for sending telemetry data as to the geographical location of the first GPS receiver;

a second GPS receiver including means for receiving a plurality of GPS signals from different sources and means for determining a geographical location of the second receiver;

receiver means associated with the second receiver for receiving the telemetry data from the first GPS receiver;

calculating means associated with the second GPS receiver for comparing the geographical locations represented by the first GPS receiver telemetry data and the geographical location determined by the second GPS receiver, and for calculating an approximate direction, a distance, and a relative height variance between said first GPS and said second GPS receivers; and a display associated with the second GPS receiver for indicating the approximate distance, the direction and the relative height variance between the first GPS and the second GPS receivers.

2. The relative position indicating system of claim 1, wherein the transmitter associated with the first GPS receiver further comprises means for selectively tuning said transmitter to broadcast on a desired frequency.

3. The relative position indicating system of claim 1, wherein the second GPS receiver further comprises means for selectively tuning said receiver to receive a desired frequency.

4. The relative position indicating system of claim 1, wherein the system further comprises:

a transmitter means associated with the second GPS receiver for sending telemetry data as to the geographical location of the first GPS receiver;

a receiver means associated with the first GPS receiver for receiving the telemetry data as to the geographical location of the second GPS receiver;

calculating means associated with the first GPS receiver for comparing the geographical locations represented by the second GPS receiver telemetry data and the geographical location determined by the first GPS receiver, and for calculating the approximate distance, the direction, and the relative height variance between said first GPS and said second GPS receivers.

5. A method for determining the relative position between two GPS position determining devices, said method comprising the steps of:

a) providing a first GPS device capable of determining its position on or above the earth by determining a latitude and longitude, said determined latitude and longitude based on position information received from a plurality of GPS signals by the first GPS device, b) providing a second GPS device capable of determining its position on or above the earth as in step a), c) providing a transmitter for the first GPS device for broadcasting the position determined by said device as telemetry data, d) providing a receiver for the second GPS device for receiving the telemetry data broadcast by the first GPS device, and e) determining a relative position between said first and second GPS devices and calculating and displaying:
      1) a relative distance between the first GPS and the second GPS devices,
      2) a direction in degrees from the second GPS device to the first GPS device, and
      3) a positive or negative difference in elevation between the first GPS and the second GPS devices.

6. The method as defined in claim 5, wherein determining a position of the first GPS device in step a) further comprises the step of determining a latitude and longitude, said determined latitude and longitude based on similar intentionally introduced errors in position information received from the plurality of GPS signals by the first GPS and the second GPS receivers, rendering said position accurate to within approximately 100 meters.

7. The method as defined in claim 5, wherein determining a position on the earth of the second GPS device in step b) further comprises the step of determining a latitude and longitude, said determined latitude and longitude being based on similar intentionally introduced errors in position information received from the plurality of GPS signals by the first GPS and the second GPS receivers, rendering said position accurate to within approximately 100 meters.

8. The method as defined in claim 5, wherein providing a transmitter for broadcasting the position of the first GPS device in step c) further comprises the step of providing a means for selectively broadcasting telemetry data at a desired frequency.

9. The method as defined in claim 5, wherein providing a receiver in the second GPS device for receiving the broadcast telemetry data of the first GPS device in step d) further comprises the step of providing a means for selectively tuning said receiver to receive a desired frequency.

10. A method as defined in claim 5, wherein the method includes the more specific steps of determining the relative position between a golfer and a golf hole both equipped with GPS position determining devices, said method comprising the more specific steps of:

a) disposing the first GPS device near to the golf hole, and
    b) enabling the second GPS device to be carried by the golfer.

11. A method as defined in claim 5, wherein the method includes the more specific steps of determining the relative position between a parent and a child both equipped with GPS position determining devices, said method comprising the steps of:

a) associating the first GPS device with the child, and
    b) enabling the second GPS device to be carried by the parent.

12. A method as defined in claim 5, wherein the method includes the more specific steps of determining the relative position between a backpacker and rescuers both equipped with GPS position determining devices, said method comprising the steps of:

a) enabling the first GPS device to be carried by the backpacker, and
    b) enabling the second GPS device to be carried by the rescuers.

13. A method for determining the relative position between two GPS position determining devices, said method comprising the steps of:

a) activating a first GPS device capable of determining its position on or above the earth,
    b) activating a second GPS device capable of determining its position on or above the earth,
    c) activating a transmitter and receiver for the first GPS device for broadcasting the position determined by said first device as telemetry data, and for receiving telemetry data from the second GPS device,
    d) activating a transmitter and receiver for the second GPS device for broadcasting the position determined by said second device as telemetry data, and for receiving telemetry data from the first GPS device, and
    e) determining a relative position between said first and second GPS devices by calculating and displaying:
       a) a relative distance between the first GPS and the second GPS devices,
       b) a direction in degrees from the second GPS device to the first GPS device,
       c) a direction in degrees from the first GPS device to the second GPS device, and
       d) a positive or negative difference in elevation between the first GPS and the second GPS devices.

* * * * *